United States Patent [19]

Mizukoshi

[11] 4,004,105
[45] Jan. 18, 1977

[54] MULTIFREQUENCY SIGNAL RECEIVER FOR USE IN TELEPHONE SIGNALING SYSTEMS OR THE LIKE

[75] Inventor: Shigeyuki Mizukoshi, Tokyo, Japan
[73] Assignee: Iwatsu Electric Co., Ltd., Tokyo, Japan
[22] Filed: May 13, 1975
[21] Appl. No.: 576,961
[30] Foreign Application Priority Data
May 15, 1974 Japan .............................. 49-54057
[52] U.S. Cl. ......................................... 179/84 VF
[51] Int. Cl.² ......................................... H04M 1/50
[58] Field of Search .......... 179/84 VF; 340/171 R, 340/171 A, 171 PF; 328/13, 28, 31, 118; 307/261

[56] References Cited
UNITED STATES PATENTS

| | | | |
|---|---|---|---|
| 3,701,857 | 10/1972 | Usuda | 179/84 VF |
| 3,795,775 | 3/1974 | Cowpland | 179/84 VF |
| 3,851,112 | 11/1974 | Kusan | 179/84 VF |
| 3,875,347 | 4/1975 | Alaily | 179/84 VF |
| 3,914,557 | 10/1975 | O'Neill | 179/84 VF |

Primary Examiner—Kathleen H. Claffy
Assistant Examiner—Joseph A. Popek
Attorney, Agent, or Firm—Woodcock Washburn Kurtz & Mackiewicz

[57] ABSTRACT

A receiver well adapted for reception of, for example, multifrequency call signals from a pushbutton telephone and for delivery of corresponding outputs to an automatic switchboard or the like. The receiver includes bandpass filters connected to an input which is to be coupled to a telephone line or the like, each bandpass filter permitting the passage therethrough of an incoming signal of a preselected frequency only. Individually connected to the outputs of the bandpass filters are detector circuits which are associated with detector control means such that, during the detecting operation of any one detector circuit, the others are rendered unresponsive to other incoming signals or noise whose voltage is less than that of the signal supplied to the operating circuit. Outputs from the detector circuits are delivered through suitable output circuits to equipment connected in the succeeding stage of the receiver.

5 Claims, 7 Drawing Figures

MULTIFREQUENCY SIGNAL RECEIVER FOR USE IN TELEPHONE SIGNALING SYSTEMS OR THE LIKE

BACKGROUND OF THE INVENTION

This invention relates generally to receivers, and more specifically to a multifrequency signal receiver for receiving and separately detecting several electrical signals of different frequencies transmitted through a single transmission medium or channel such as, typically, the usual telephone line.

Multifrequency signaling systems have been finding everincreasing use in recent years. U.S. Pat. No. 3,076,059, issued to L. A. Meacham et al., for example, discloses an example of such multifrequency signaling systems which can be utilized in telephone subscriber signaling systems. This prior art system includes a receiver capable of receiving multifrequency signals transmitted as from pushbutton telephone transmitters. For example, upon depression of the buttons marked 1, 2, 3 and so forth on the pushbutton telephone, electrical signals are generated which have frequencies corresponding to the respective buttons depressed, and these signals are transmitted to, and detected by, the receiver. The detected signals may be utilized by the receiver for the delivery of the corresponding outputs to a computer or to an automatic telephone switchboard. The system is also adaptable for end-to-end transmission of various information signals.

The transmission of multifrequency signals over telephone lines has the problem that the signal receiver tends, erroneously, to detect noise or voice signals traveling the same lines as the valid signals. According to one of the several proposals heretofore made to overcome this problem, two signals having appreciably different frequency components are employed to represent in combination each valid signal to be transmitted, and the receiver receives the two signals to detect the desired valid signal therefrom. The receiver is then less likely to make the noted erroneous signal detection that in the case where each incoming signal represents a different piece of information to be detected.

This proposal, however, also has its own disadvantages. If, during transmission of an information signal of a certain frequency, noise or voice signal is generated which has the same frequency component as the frequency of some other information signal, the receiver will detect such noise just as it does the valid information signal. Also, if two signals having different frequency components originate simultaneously due to noise or voice signals, then the receiver will erroneously derive some piece of information from the two signals. Outputs produced by the receiver as a result of inputs other than the valid information signals, of course, cause erroneous operation of the computor or the like connected in the subsequent stage of the receiver.

SUMMARY OF THE INVENTION

It is therefore an object of this invention to provide a multifrequency signal receiver having a greatly reduced possibility of producing erroneous output signals in response to inputs other than valid information signals and hence to enhance the reliability of the receivers of the class and kind under consideration.

Another object of the invention is to realize such enhanced reliability in a receiver of extremely simplified and inexpensive circuit configuration.

A further object is to provide a receiver well adapted for reception of call or other information signals transmitted from pushbutton telephones.

A further object is to provide a receiver which, upon reception of information signals as from a pushbutton telephone, produces corresponding outputs suitable for delivery to a computor, automatic telephone switchboard, or like instruments.

A still further object is to provide a receiver which is also well adaptable for use in the end-to-end transmission of intelligence over a communications channel or in the control of one end instrument by the other.

With all these and other objects in view this invention provides a multifrequency signal receiver including input means for connection to a transmission medium such as a telephone line through which several electrical signals of different frequencies are transmitted. Connected to the input means are a plurality of bandpass filters each permitting the passage therethrough of an incoming signal of a preselected frequency only. The outputs of the bandpass filters are connected to respective detector circuits each adapted to produce an output signal upon detection of the incoming signal that has passed through the particular filter to which the detector circuit is connected. All the detector circuits are associated with detector control means which, during the detecting operation of any one detector circuit, makes the others substantially unresponsive to other incoming signals or noise which may be supplied simultaneously. The outputs of the detector circuits are connected to respective output circuits for the delivery therethrough of the output signals from the detector circuits.

According to a preferred embodiment of the invention to be disclosed subsequently, each detector circuit comprises a transistor having its emitter grounded, and the emitters of all the detector transistors are interconnected. The transistors thus connected are designed to function not only as detectors but as gating circuits such that, during the detecting operation of any one transistor, the other transistors will not produce an output signal when supplied with an input signal having a magnitude less than that of the input signal to the transistor in operation.

Also in the preferred embodiment of the invention the detector control means includes means for selectively varying the emitter bias voltage of the detector transistors. The latter means comprises a common line interconnecting the emitters of the detector transistors, and a resistor connected between the common line and one of a pair of biasing power lines the other of which is connected to the collectors of the transistors.

The output means of the receiver can take the form of terminals suitable for the delivery therethrough of, for example, control signals to an automatic telephone switchboard or information signals to a computor.

The features which are believed to be novel and characteristic of this invention are set forth in particular in the appended claims. The invention itself, however, both as to its organization and mode of operation, together with the further objects and advantages thereof, will become apparent in the course of the following description of some preferred embodiments, which is to be read in connection with the accompany-

DETAILED DESCRIPTION OF THE INVENTION

Figure 1:
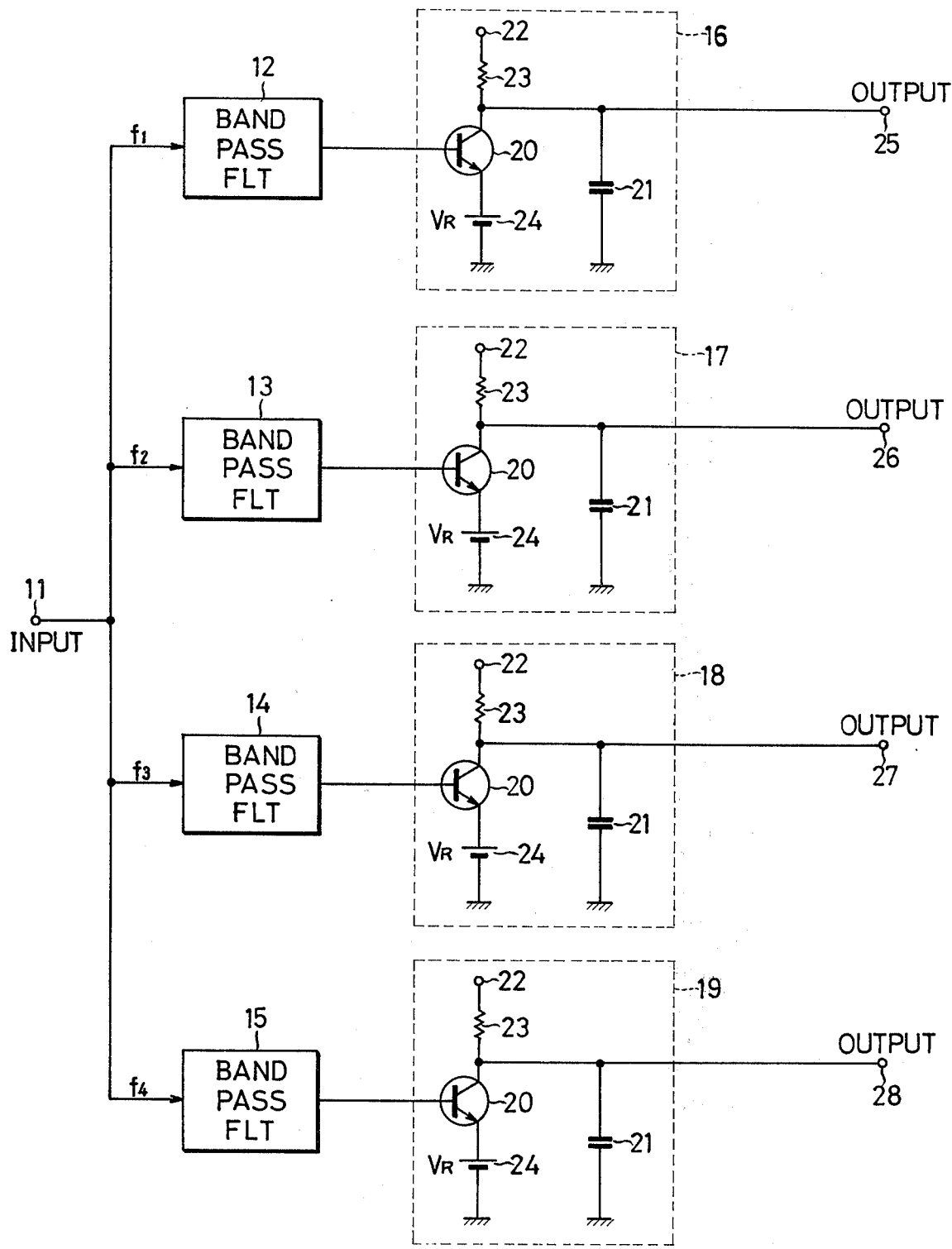
FIG. 1 is a schematic electrical diagram of a prior art multifrequency signal receiver comparable to the receiver of this invention.

It is considered essential that a typical prior art multifrequency signal receiver be shown and described in some detail, the better to clarify the features and advantages of this invention. With reference therefore to FIG. 1 the illustrated conventional receiver has an input terminal 11 which may be coupled to a suitable signal transmission medium such as a telephone line. The input terminal 11 is connected to four sharply tuned bandpass filters 12, 13, 14 and 15 having different transmission bands or frequencies. For the sake of convenience the filter 12 may be considered to pass a signal of frequency $f1$, the filter 13 a signal of frequency $f2$, the filter 14 a signal of frequency $f3$, and the filter 15 a signal of frequency $f4$.

The bandpass filters 12 to 15 are connected to detectors 16, 17, 18 and 19, respectively, each comprising a transistor 20, capacitor 21, biasing power terminal 22, resistor 23, and power supply 24 for biasing the emitter of the transistor 20. The detectors 16 to 19 have output terminals 25, 26, 27 and 28 which are intended to be connected to equipment to be controlled by the output signals from the receiver. In the circuit configuration shown the detectors will produce low level output signals from the terminals 25 to 28.

Assume that the input terminal 11 of this prior art multifrequency signal receiver has just received the signal of frequency $f1$. The signal will pass through the filter 12 and will be detected by the detector 16, the latter thereupon producing an output from the terminal 25. The other filters 13 to 15 do not pass the signal of frequency $f1$, so that no output will be produced from the terminals 26 to 28.

Output production from each of the detectors 16 to 19 results when there is applied to the base of the transistor 20 a voltage in excess of the sum of the emitter bias voltage $V_R$ and the threshold value (i.e., about 0.6 volt) of the base-emitter voltage of the transistor. Thus, in the circuitry of FIG. 1, simultaneous output production from two or more of the output terminals 25 to 28 would not take place if valid informaton signals of frequencies $f1$ to $f4$ were delivered successively to the input terminal 11.

In practice, however, the input terminal 11 inevitably receives undesired voice signals and noise as the reciever is connected to the usual telephone line. Should noise of frequency $f2$ be supplied in a detectable level during reception of the desired signal of frequency $f1$, for example, then outputs will be simultaneously produced from terminals 25 and 26. This of course results in the erroneous operation of the equipment connected to the output terminals 25 to 28. The present invention aims at the elimination of this serious defect of the prior art multifrequency signal receiver.

Figure 2:
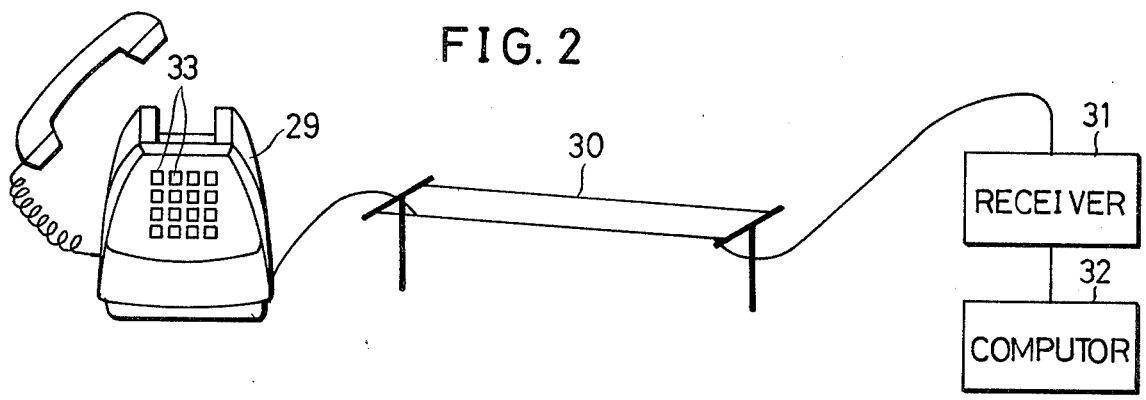
FIG. 2 is a block diagram of an example of signal transmission system in which the receiver of the invention finds application.

By way of clarification of the environment of this invention FIG. 2 schematically illustrates an example of signal transmission system in which the multifrequency signal receiver according to the invention is adaptable for use. Shown at 29 is a pushbutton telephone set which for purposes of the invention may be considered a transmitter. The pushbutton telephone transmitter 29 is connected via the usual telephone line 30 to the receiver 31 according to the invention, and the receiver is further connected to a computor 32.

Figure 3:
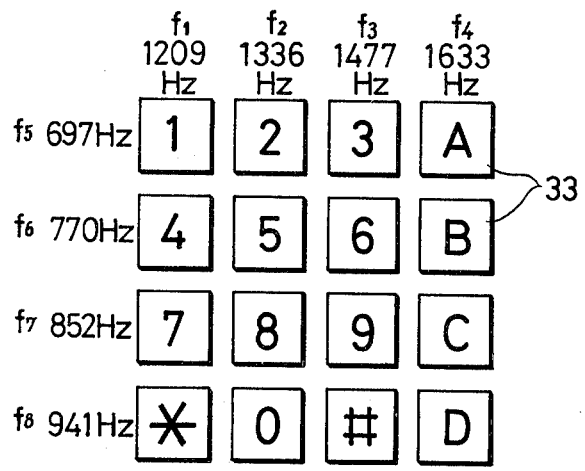
FIG. 3 is a diagram explanatory of the arrangement of buttons on the pushbutton telephone used in the signal transmission system of FIG. 2 and of the frequencies of signals to be generated upon depression of the respective buttons.

FIG. 3 illustrates an array of pushbuttons 33 on the telephone transmitter 29 of FIG. 2. Depression of any one of these pushbuttons causes the transmitter to originate and transmit two signals of predetermined different frequencies. Upon depression of the pushbutton marked 1, for example, two signals of 1209 Hz and 697 Hz will be transmitted. Similarly the depression of the pushbutton marked 2 will result in the transmission of signals of 1336 Hz and 697 Hz. The telephone transmitter 29 is thus capable of transmitting ten different combinations of signals corresponding to the pushbuttons carrying the digits 1 through 0, and six different combinations of signals corresponding to the pushbuttons carrying the indicia A, B, C, D, * and # .

The output signals from the telephone transmitter 29 are received by the receiver 31, which in turn delivers its outputs to the computor 32. It is to be understood, however, that this computor is replaceable by an automatic telephone switchboard, terminal equipment and other essentially equivalent means within the scope of this invention.

Figure 4:
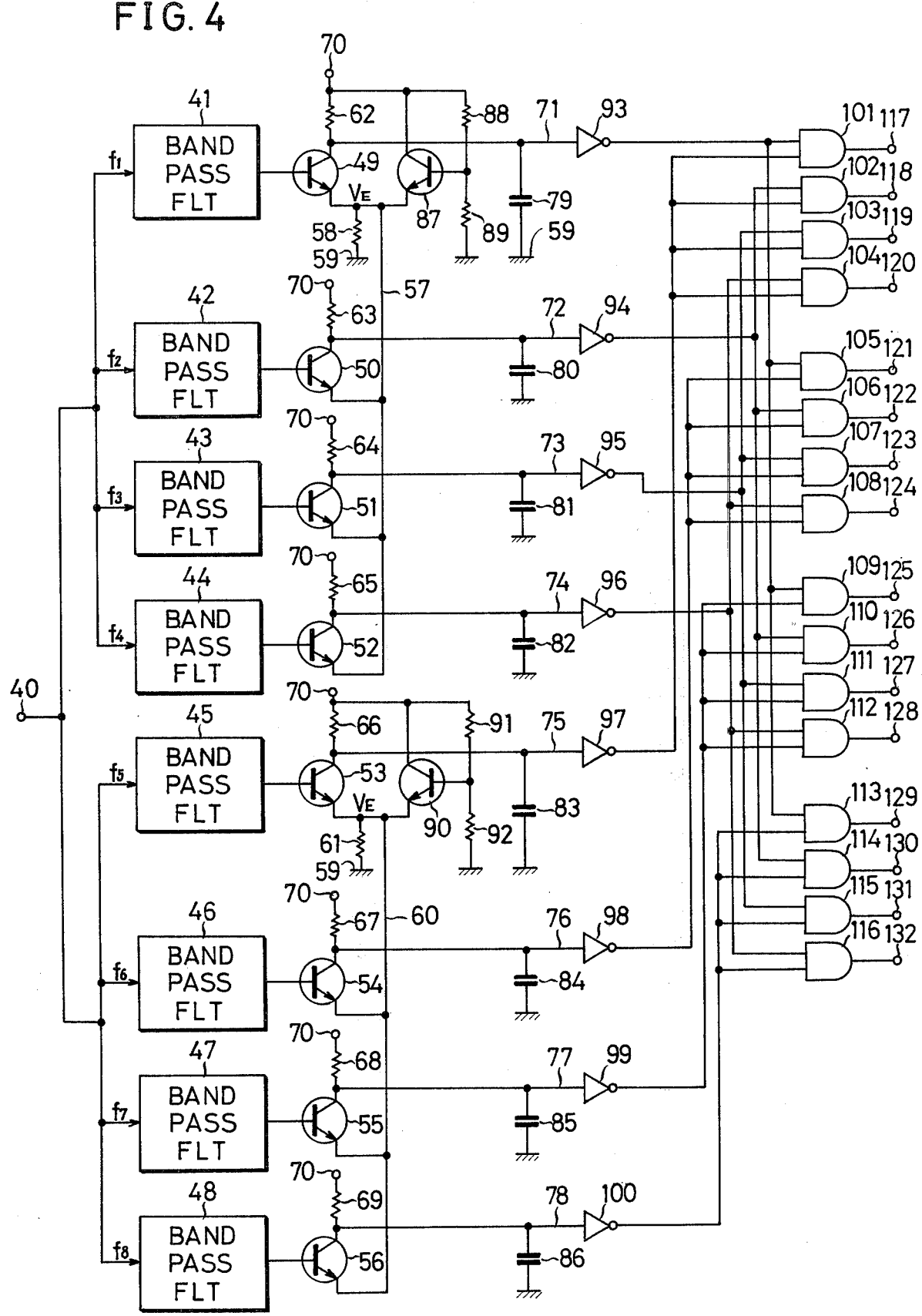
FIG. 4 is a schematic electrical diagram of the multifrequency signal receiver embodying this invention.

FIG. 4 illustrates the circuit configuration of the multifrequency signal receiver embodying the invention. The receiver includes input means in the form of a terminal 40 which can be connected to the telephone line 30 of FIG. 2. The input terminal 40 is connected to a total of eight bandpass filters 41 to 48 which permit the passage therethrough of the signals of the frequencies $f1$ to $f8$ given in FIG. 3, respectively. The eight bandpass filters 41 to 48 have therefore different transmission bands or frequencies.

The outputs of the bandpass filters 41 to 48 are connected to the bases of respective transistors 49 to 56 adapted to function as detector circuits. The transistors 49 to 56 are divided into two groups, a first group consisting of the transistors 49 to 52 and a second group the transistors 53 to 56. A common line 57 interconnects the emitters of all the transistors 49 to 52 of the first group and is connected to the ground 59 via a resistor 58. In this embodiment of the invention the common line 57 and resistor 58 constitute detector control means for selectively varying the emitter bias voltage of the detector transistors 49 to 52, as will more fully appear hereinbelow.

It should be noted that the ground 59 is intended to function as a ground level biasing power line in conjunction with another biasing power line which is shown as individual terminals 70 to facilitate illustration. A positive voltage of, say, 12 volts is to be supplied from the terminals 70. The ground 59 is therefore hereinafter referred to as the ground level biasing power line, and the terminals 70 collectively as the biasing power line.

The emitters of the second group of transistors 53 to 56 are likewise interconnected by a common line 60, and a resistor 61 is connected between the common line 60 and the ground level biasing power line 59. The collectors of the first group of transistors 49 to 52 are connected to the biasing power line 70 via respective resistors 62 to 65, and the collectors of the second group of transistors 53 to 56 are also connected to the biasing power line 70 via respective resistors 66 to 69. The collectors of all the transistors 49 to 56 are further connected to respective output lines 71 to 78. Smoothing capacitors 79 to 86 are connected between the output lines 71 to 78 and the ground level biasing power line 59.

The aforesaid common line 57 also serves to connect the emitters of the first group of transistors 49 to 52 to the emitter of a transistor 87 which may be considered a part of the detector control means. Connected to the base of this transistor 87 is a biasing circuit for applying a predetermined bias voltage thereto. The biasing circuit is shown to comprise resistors 88 and 89 serially connected between the pair of biasing power lines 59 and 70. The collector of the transistor 87 is connected to the biasing power line 70.

Similarly, the emitters of the second group of transistors 53 to 56 are connected via the common line 60 to the emitter of a transistor 90, the collector of which is connected to the biasing power line 70. The base of this transistor is connected to a biasing circuit for applying a predetermined bias voltage thereto. The biasing circuit is shown to comprise resistors 91 and 92.

The output lines 71 to 78 are connected to respective NOT gates or inverter circuits 93 to 100. These inverter circuits are designed to change the low level outputs from the respective detector circuits to high level signals.

The reference numerals 101 to 116 denote AND gates each having two inputs connected to each two different ones of the first and second groups of inverter circuits 93 to 100 as shown. Each AND gate is thus adapted to produce an output only when simultaneously supplied with two input signals from the first and second groups of detector circuits. The AND gates 101 to 116 have output terminals 117 to 132 respectively.

As will be seen from a consideration of FIGS. 3 and 4 the sixteen output terminals 117 to 132 of the multifrequency signal receiver are related to the respective pushbuttons 33 of the telephone transmitter 29. The output terminal 117 corresponds to the pushbutton marked 1; the output terminals 118 to the pushbutton 2; the output terminal 119 to the pushbutton 3; the output terminal 120 to the pushbutton A; the output terminal 121 to the pushbutton 4; the output terminal 122 to the pushbutton 5; the output terminal 123 to the pushbutton 6; the output terminal 124 to the pushbutton B; the output terminal 125 to the pushbutton 7; the output terminal 126 to the pushbutton 8; the output terminal 127 to the pushbutton 9; the output terminal 128 to the pushbutton C; the output terminal 129 to the pushbutton *; the output terminal 130 to the pushbutton 0; the output terminal 131 to the pushbutton # ; and the output terminal 132 to the pushbutton D.

In the operation of the multifrequency signal receiver of FIG. 4, assume that the operator has depressed the pushbutton marked 1 on the telephone transmitter 29 of FIG. 2, with the handset lifted off its mounting. There will be simultaneously generated thereupon a signal of the frequency $f1$ (1209 Hz) and a signal of the frequency $f5$ (697 Hz) in the form of sine waves. Since the pushbuttons 33 on the telephone transmitter 29 are assumed to be depressed one by one, as is the usual practice, only the signals of the frequencies $f1$ and $f5$ can be considered to be generated simultaneously at a given instant. These signals are transmitted through the telephone line 30 to the input terminal 40 of the multifrequency signal receiver generally labeled 31 in FIG. 2.

With reference now directed to FIG. 4 the incoming signal of the frequency $f1$ is allowed to pass through the bandpass filter 41 only, and the other incoming signal of the frequency $f5$ to pass through the bandpass filter 45 only. The signals are then detected by the transistors 49 and 53 respectively. Upon detection of the signal of the frequency $f1$ the transistor 49 will deliver an output signal to one of the inputs and the AND gate 101 via the inverter circuit 93, and the transistor 53 upon detection of the signal of the frequency $f5$ will similarly deliver an output signal to the other input of the AND gate 101 via the inverter circuit 97. The AND gate 101 therefore produces an output signal at its terminal 117.

Since the output terminal 117 corresponds to the telephone pushbutton marked 1 as aforesaid, the depression of this particular pushbutton results in the production of a corresponding output signal from the receiver. This output signal can be utilized as an input to the computor 32 or the like.

Similarly, upon depression of the pushbutton marked 2 on the telephone transmitter 29 of FIG. 2, the transmitter will originate two signals of the frequencies $f2$ (1336 Hz) and $f5$ (697 Hz). These signals are to be detected by the respective transistors 50 and 53 in the receiver of FIG. 4, so that the receiver will produce an output signal at the output terminal 118 of the AND gate 102. This output terminal 118 corresponds to the pushbutton marked 2. In this manner the successive, selective depression of the pushbuttons 33 on the telephone transmitter 29 results in the successive production of output signals from the corresponding ones of the output terminals 117 to 132.

It should be noted that signal detection by each of the transistors 49 to 56 takes place only when the signal applied to its base has a voltage in excess of the sum of the threshold value (e.g., 0.6 volt) of the base-emitter voltage and the emitter voltage $V_E$ of the transistor as determined by the transistor 87 or 90.

Assume that the signal of the frequency $f1$ has just been impressed to the base of the transistor 49 and, consequently, that conduction has been initiated through this particular transistor. Since then a current flows through the resistor 58 via the transistor 49, the emitter voltage of this transistor increases by $v$ volts, that is, to $V_E + v$ volts. This results in the simultaneous increase to $V_E + v$ of the emitter voltages of all the other transistors 50 to 52 of the first group, because the emitters of all the transistors 49 to 52 are interconnected by the common line 57 constituting a part of the detector control means. As a consequence, conduction will not take place through the other transistors 50 to 52 unless there is applied to their bases a signal having a voltage exceeding $0.6 + V_E + v$ volts. Thus, during operation of any one detector transistor, the other transistors of the same group are substantially unresponsive to signals which may be supplied simultaneously.

It is possible, for example, that during detection of the signal of the frequency $f1$ by the transistor 49, some voice signal or noise having a component of the frequency $f2$ be delivered to the base of the transistor 50. The transistor 50 will then remain nonconductive if the undesired signal or noise has a voltage of less than $0.6 + V_E + v$ volts, that is, if the level of the undesired signal impressed to the base of the transistor 50 is less than that of the valid signal of the frequency $f1$ impressed to the base of the transistor 49. No undesired output signal is therefore to be produced from the output terminal 118. The foregoing description holds true with the second group of transistors 53 to 56.

As may now be apparent the conduction of any one of the detector transistors of each group reduces the possibility of conduction taking place through the other transistors of that group. It will therefore be appreciated that the multifrequency signal receiver of FIG. 4 is significantly less likely to produce erroneous output signals in response to undesired inputs.

Figure 5:
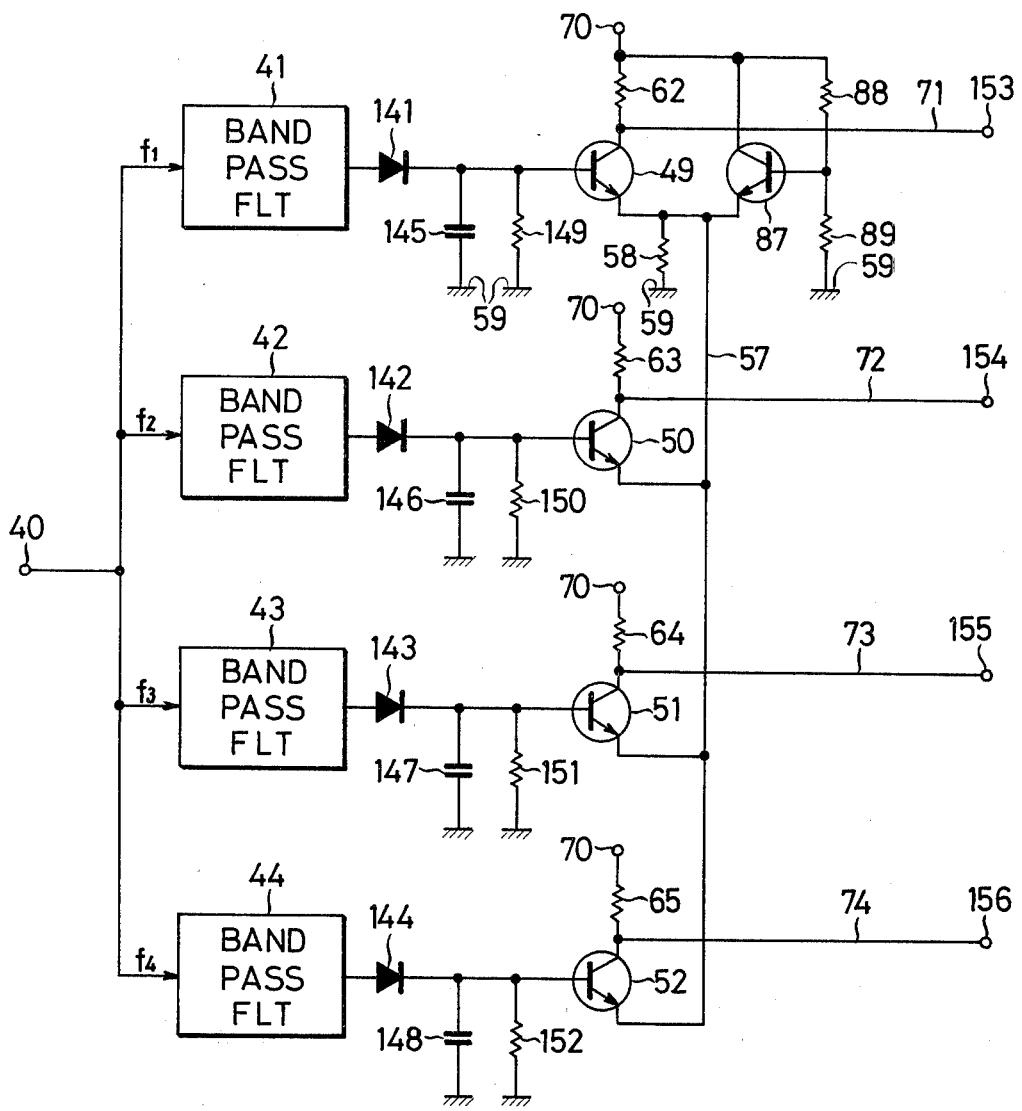
FIG. 5 is a partial, schematic electrical diagram of another preferred embodiment of the invention.

FIG. 5 illustrates another preferred embodiment of this invention, in which parts corresponding to those of the FIG. 4 embodiment are identified by the same reference characters. The diagram shows only the first group of circuit elements, it being understood that the second group is of identical configuration. This second embodiment differs from the preceding embodiment principally in that the transistors 49 to 52 (and, of course, 53 to 56) are designed to function merely as gating circuits, the desired detector circuits being provided separately.

The detector circuits include diodes 141 to 144, respectively, that are connected to the outputs of the bandpass filters 41 to 44 the inputs of which are connected to the common input terminal 40. The detector circuits further comprise capacitors 145 to 148 and resistors 149 to 152, respectively.

The gating circuits are composed of the transistors 49 to 52 having their bases connected to the outputs of the aforesaid detector circuits and their collectors to output terminals 153 to 156 via lines 71 to 74, respectively. The collectors of the transistors 49 to 52 are further connected to the biasing power line or terminals 70 via respective resistors 62 to 65.

The gating circuits or transistors 49 to 52 are associated with gating control means comprising the common line 57 interconnecting the emitters of all the transistors 49 to 52, and the resistor 58 connected between the common line 57 and the ground level biasing power line 59. The gating control means additionally includes the transistor 87 having its emitter connected to the common line 57 and its collector to the biasing power line 70. The base of this transistor 87 is connected to the biasing circuit comprising the resistors 88 and 89 serially connected between the pair of biasing power lines 59 and 70.

If, in the multifrequency signal receiver of FIG. 5, a signal of the frequency $f1$ is delivered to the input terminal 40 as from the pushbutton telephone transmitter 29 of FIG. 2, the signal will pass through the bandpass filter 41 only and will be detected by the detector diode 141. The corresponding output from the diode is then impressed to the base of the gating transistor 49. Conduction will be initiated through this transistor if the output voltage from the detector diode 141 is higher than $0.6 + V_E$ volts, with the result that the output signal is delivered to the output terminal 153.

Upon conduction of the gating transistor 49 its emitter voltage rises by $v$ volts, to the total of $V_E + v$ volts, as in the FIG. 4 embodiment. The other gating transistors 50 to 52 will therefore be held nonconductive unless supplied with an input voltage of more than $0.6 + V_E + v$ volts. That is to say, during conduction of any one gating transistor, the other gating transistors are substantially unresponsive to undesired input signals or noise. Thus, the receiver of FIG. 5 also succeeds in substantially eliminating the possibility of producing erroneous outputs in response to undesired inputs.

Figure 6:
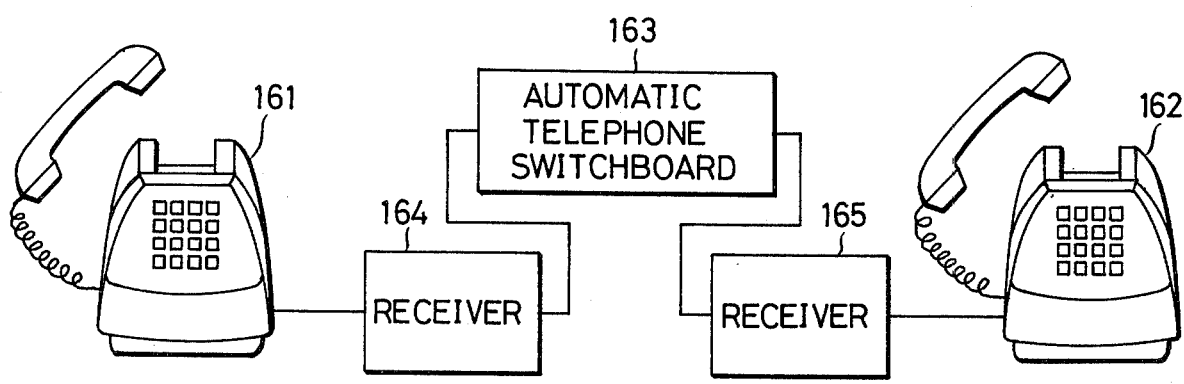
FIG. 6 is a block diagram of a telephone circuit in which the receiver of FIG. 4 or 5 is adaptable for use.

FIG. 6 diagrammatically illustrates another possible application of the multifrequency signal receiver shown in FIG. 4 or 5. The diagram shows two pushbutton telephone sets 161 and 162 for interconnection by an automatic switchboard 163 via receivers 164 and 165 of the type shown in FIG. 4 or 5 according to the invention. The customer may depress the buttons on one pushbutton telephone 161 to call the number assigned to the other pushbutton telephone 162. As previously explained in conjunction with FIG. 3 the depression of each pushbutton results in the production of two signals of different frequencies. These call signals are received by the receiver 164, which thereupon produces outputs from those of its output terminals which correspond to the pushbuttons depressed by the customer. The outputs from the receiver 164 are utilized to form pulse signals required by the automatic switchboard 163, and the latter on the basis of these pulse signals establishes electrical connection between the two telephones 161 and 162.

Figure 7:
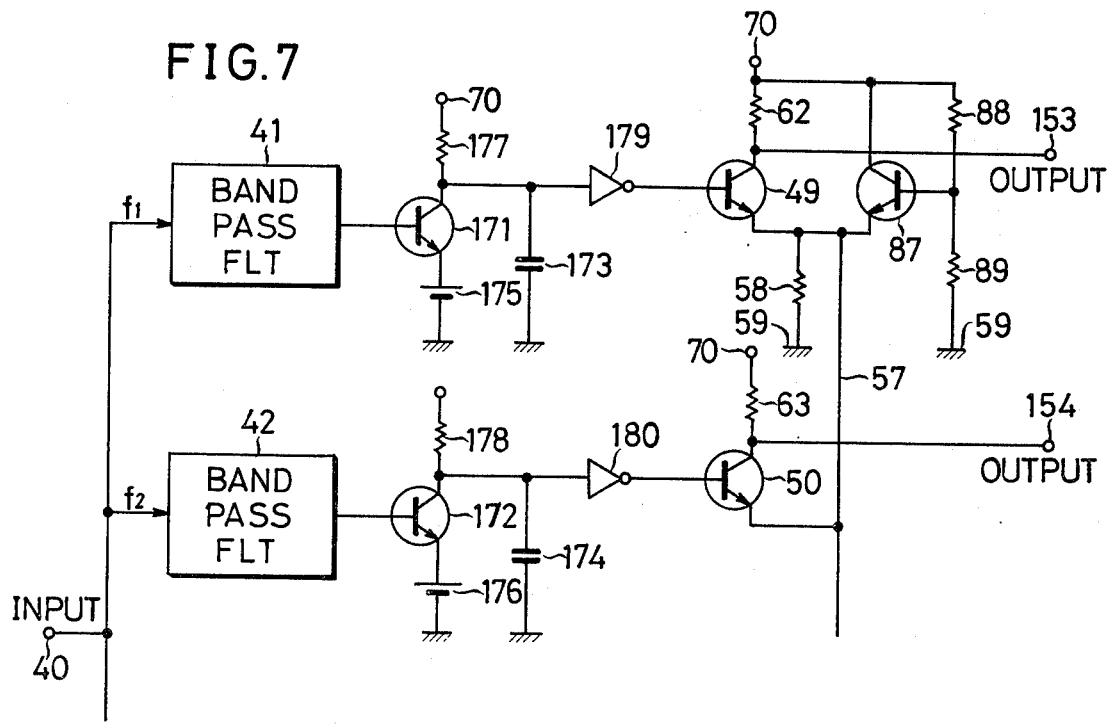
FIG. 7 is a partial, schematic electrical diagram of a modification of the receiver of FIG. 5.

FIG. 7 illustrates a slight modification of the FIG. 5 embodiment, in which the detector circuits include transistors 171, 172 . . . having their bases connected to the outputs of the bandpass filters 41, 42 . . . respectively. The detector circuits additionally comprise capacitors 173, 174 . . . , emitter biasing power supplies 175, 176 . . . , resistors 177, 178 . . . , and inverters 179, 180 . . . . Other details of circuit configuration are exactly the same as those shown in FIG. 5, and the operation of this modified receiver is considered self-evident from the foregoing description of FIGS. 4 and 5.

It is believed that the various objects of this invention, either explicitly stated or otherwise, have been fully accomplished in the several exemplified receivers shown and described hereinbefore. It is also understood, however, that the invention itself is not to be restricted by the exact showing of the drawings or the description thereof but is inclusive of many modifications or changes falling within the scope of the following claims.

I claim:

1. A multifrequency signal receiver capable of separately detecting a plurality of incoming electrical signals of different frequencies transmitted through a common transmission medium, said receiver comprising input means connected to said transmission medium, a plurality of bandpass filters connected to said input means each permitting the passage therethrough of the incoming signal of a preselected frequency, and a plurality of detectors connected to said plurality of bandpass filters respectively, the improvement comprising:

a. a plurality of detector control transistors having bases coupled to said bandpass filters and associated with said detectors, respectively, each detector control transistor being operative to produce an output signal in response to the particular incoming signal which is passed through the bandpass filter to which the detector control transistor is connected;

b. a pair of biasing power lines for biasing said detector transistor;

c. a plurality of first resistors connected between one of said biasing power lines and the collectors of said detector control transistors, respectively;

d. a common line connecting emitters of said detector control transistors;

e. a second resistor connected between said common line and the other of said biasing power lines; and f. a plurality of output circuits connected to the collectors of said detector control transistors, respectively, for delivery therethrough of the output signals from said detector control transistors, whereby, during operation of any one of said detector control transistors, the other of said detector control transistors are held unresponsive to any incoming signals applied thereto whose voltage is less than the voltage of an incoming signal supplied to said one detector controlled transistor.

2. The receiver as recited in claim 1, further comprising another transistor having an emitter connected to said common line and a collector connected to said one biasing power line, and a biasing circuit connected to a base of said other transistor for applying a predetermined bias voltage thereto.

3. The receiver as recited in claim 1, further comprising a plurality of capacitors connected between the collectors of said detector transistors and said other biasing power line, respectively.

4. The receiver as recited in claim 1, wherein said other biasing power line is of ground level.

5. The receiver as recited in claim 1, further comprising a plurality of detector diodes interposed between said bandpass filters and said detector control transistors respectively.

* * * * *